United States Patent [19]

Tauer

[11] 4,097,121

[45] Jun. 27, 1978

[54] LIQUID-CRYSTAL DISPLAY WITH BISTABLE CHOLESTERIC LIQUID-CRYSTAL LAYER AND METHOD OF MAKING THE SAME

[75] Inventor: Miroslav Tauer, Munich, Germany

[73] Assignee: Siemens Aktiengesellschaft, Berlin & Munich, Germany

[21] Appl. No.: 723,151

[22] Filed: Sep. 14, 1976

[30] Foreign Application Priority Data

Sep. 22, 1975 Germany .............................. 2542166

[51] Int. Cl.² .................................................. G02F 1/13
[52] U.S. Cl. ...................................... 350/333; 350/350
[58] Field of Search ............ 350/160 LC; 340/324 M

[56] References Cited

U.S. PATENT DOCUMENTS

| | | | |
|---|---|---|---|
| 3,861,783 | 1/1975 | Dill | 350/160 LC |
| 3,863,332 | 2/1975 | Leupp | 350/160 LC |
| 3,954,325 | 5/1976 | Borden | 350/160 LC |
| 3,966,305 | 6/1976 | Young | 350/160 LC |
| 3,978,580 | 9/1976 | Leupp | 350/160 LC |

Primary Examiner—Samuel W. Engle
Assistant Examiner—Donald P. Walsh
Attorney, Agent, or Firm—Hill, Gross, Simpson, Van Santen, Steadman, Chiara & Simpson

[57] ABSTRACT

A liquid-crystal display incorporating a pair of spaced carrier plates separating a layer of liquid-crystal material, both of the plates having a set of selection conductors on their inner surfaces, defining a display matrix of visual elements, one or both sets of a selection conductors having dielectric layers on the respective conductors, forming marginal electrodes surrounding each individual visual element, the marginal electrodes being produced by a simultaneous masking and etching operation on the dielectric layer and associated conductor.

11 Claims, 2 Drawing Figures

LIQUID-CRYSTAL DISPLAY WITH BISTABLE CHOLESTERIC LIQUID-CRYSTAL LAYER AND METHOD OF MAKING THE SAME

BACKGROUND OF THE INVENTION

The invention relates to a liquid-crystal display for the representation of visual images. A liquid-crystal display of this type has been developed and comprises two carrier plates having therebetween, in hermetically sealed arrangement, a layer of cholesteric liquid crystal, each of which carrier plates have a conductor array on its inner surface facing the array carried by the other plate. The liquid-crystal has, at least in a certain frequency range, a positively anisotropic susceptibility, and a field strength equal to or greater than a first threshold value $E_{cn}$ taking on a homeotropically-nematic texture in which it remains as long as the applied field is greater than a second lower threshold value $E_{nc}$. The conductor arrays have at least one separately operable conductor for the production of a display which is formed from individual display segments, preferably formed from stripped-shaped conductors disposed to provide line conductors and column conductors of a display matrix. At least one of the two carrier plates are provided with marginal electrodes extending along the display electrodes, which marginal electrodes produce a minimum field strength $E_r$ equal to or greater than $E_{cn}$ during operation of the display structure to effect an increase in the storage time of the homeotropic nematic texture.

In accordance with one of the embodiments of such prior development, the marginal electrodes form generally annular shaped, narrow marginal zones, each of which encloses a respective display segment. In forming such a marginal zone, the marginal electrodes may supplement one another and marginal electrodes of this type have been produced by covering the picture electrode with a dielectric layer, which covers a display segment but leaves a narrow marginal zone of the electrode exposed. The dielectric constant of such dielectric layer is smaller than that of the liquid-crystal layer, and in particular smaller than its component in the direction of the longitudinal axis of the liquid-crystal molecules. The dielectric layer is so dimensioned that a minimum field strength $E_r = E_{cn}$ may exist in the liquid-crystal layer at the location of the marginal zone and, simultaneously, a field strength $E_h < E_{cn}$ may simultaneously exist at the location of the picture segment enclosed by such a marginal zone.

The formation of an indestructible nematic display segment margin prevents the energetically stable cholesteric structure of the liquid-crystal environment to penetrate into the homeotropic nematic texture of a liquid crystal resulting from a wiring in and maintenance thereof by a holding field, and the accompanying destruction of the stored information over a period of time, which initially takes place at the margins. By increasing the storage time, the multiplex ratio of the liquid-crystal material and thus the ratio of the maximum possible storage time with respect to the required writing-in time is increased, resulting in the ability to process larger information content in a matrix-addressed liquid-crystal display.

SUMMARY OF THE INVENTION

The invention therefore has, as a principal objective, the production of a liquid-crystal display of the type described which employs a novel structure for achieving the desired marginal electrode structure as well as affording a relatively simple, efficient and low cost structure which may be produced by relatively simple manufacturing techniques.

The invention is particularly adapted to the production of displays utilizing a matrix composed of two sets of parallel conductor strips, the strips of one set being disposed at right angles to the strips of the other set. The conductors are provided with a dielectric layer covering the conductor face with the side edges of the combined conductor and dielectric layers having approximately flat edge walls which are inclined more or less like a beveled edge, whereby the electrode edge extends laterally outwardly beyond the dielectric edge to form the desired marginal structure. Thus, particularly, where strip-like conductor-dielectric elements are involved, such elements preferably will have a transverse cross-section approximating an isosceles trapezoid. The marginal zone is thus formed by an inclined edge of the strip conductor which extends upwardly beyond the corresponding dielectric edge.

A display structure, such as that described, can be produced in a relatively very simple manner. The carrier plates are each initially coated over the entire surface of one of their sides with an electrode layer and, following the same, the entire surface of the electrode layer is coated with a dielectric layer, thus forming a double layer on the carrier plate. Such double layer is then photo-masked and the display electrodes, for example, strip line conductors of a display matrix, are etched, simultaneously etching both the dielectric layer and the electrode layer. The two carrier plates are then disposed in spaced parallel relation with the strip conductors disposed on the inner faces of the respective carrier plates with the strips on one plate extending at right angles to the strips on the other plate.

To insure formation of the desired inclined marginal profile, care must be taken to see that the double layer comprising the electrode layer and the dielectric layer is not sub-etched and thereby eliminate the desired inclined effect. It will be appreciated that with such an inclined marginal profile, the display electrode, in plan view, has marginal portions extending beyond the dielectric carried thereby and thus particularly high field strengths can be localized in the marginal zone.

BRIEF DESCRIPTION OF THE DRAWING

In the drawing wherein like reference characters indicate like or corresponding parts.

DETAILED DESCRIPTION OF A PREFERRED EMBODIMENT

Figure 1:
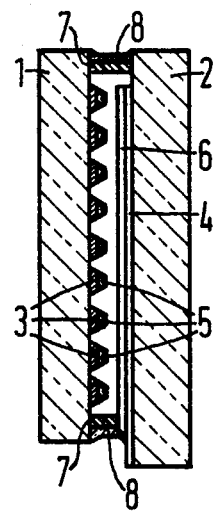
FIG. 1 is a transverse sectional view through a display structure constructed in accordance with the present invention.

The display structure illustrated in the drawings is, for example, a liquid-crystal matrix display comprising two carrier plates 1 and 2, each of which carry an electrode coating on their inner surfaces opposing one another. Each electrode coating, in the embodiment illustrated, comprises a plurality of parallel strip conductors, spaced approximately 100 $\mu$m from one another, thus forming display line conductors 3 on the plate 1 and column conductors 4 on the plate 2, with the two conductor groups being disposed in perpendicular relation with respect to one another and cooperable to form a display matrix consisting of display dots. Each display conductor carries a dielectric layer 5 or 6, respectively, and the respective carrier plates are maintained in spaced relation by a spacing frame 7 with the assembly being rigidly secured in sealed relation by suitable means such as an epoxy glue 8. The chamber thus defined is filled with a liquid-crystal material which may be introduced into the chamber through a suitable filling opening (not illustrated) which is thereafter suitably closed to form a hermetically sealed structure.

In manufacturing the display structure, the two carrier plates may be fabricated of glass, the electrode coatings formed of $In_2O_3$, the dielectric layers of $SiO_2$, the spacing frame of mylar, and the glass-solder frame of a glass solder with a low melting point. The liquid-crystal layer may comprise a nematic Az-oxy compound with cholesterol chloride. The completed display may, for example, have a plate spacing of approximately 13 $\mu$um, electrode thickness of approximately 0.3 $\mu$um, and the dielectric layer approximately 1 $\mu$um.

In operation of the matric display, the entire matrix is initially prepared by means of a nematic writing, i.e. by application of an erasure voltage of approximately 40 to 80 volts and in this state the entire picture screen is completely transparent. Any cholesteric display screen areas beyond the picture dots are so small that they do not create an optical image. Following the erasure operation, the voltage is decreased to a holding voltage of approximately 10–30 v., and the information will then be written in line-by-line and bit-by-bit by means of an interruption of the holding voltage. The entire operation will then be repeated after each display cycle. For additional details of this type of operation, reference is made to German Offenlegungsschrift No. 2,361,421 which discloses both operational and structural features of this type of device.

Figure 2:
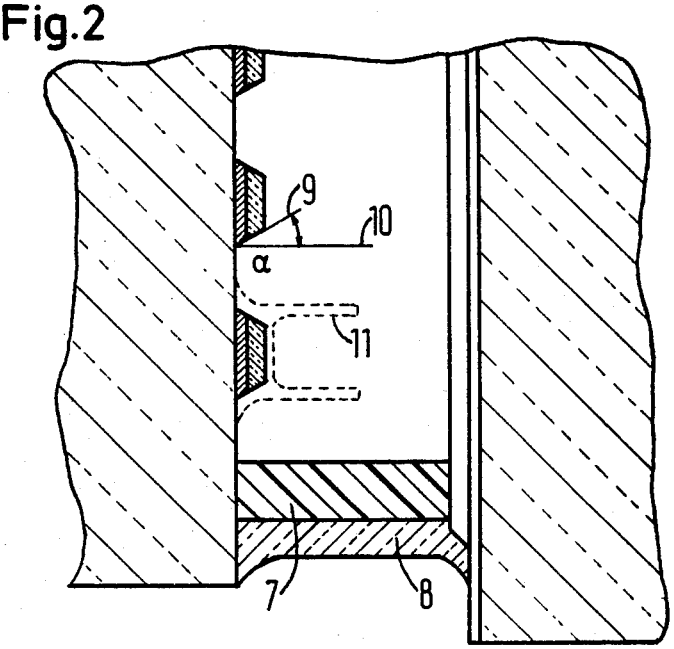
FIG. 2 is an enlarged sectional view of a portion of the structure illustrated in FIG. 1.

FIG. 2 illustrates the configuration of the double layer comprising the display strip conductor and dielectric layer, illustrating the cross-sectional configuration of the structure, in which it will be noted that the edge portions of both the dielectric layer and the electrode layer form an approximately flat edge wall, the lower portion i.e. that closest to the carrier plate, is formed by the electrode edge, while the upper or outer portion is formed by the dielectric edge, with the combined edge wall so formed being inclined, in the form of a beveled edge, whereby the electrode edge extends laterally outwardly beyond the corresponding edge of the dielectric layer.

Such edge wall is approximated by a straight line 9 in FIG. 2 which line forms an angle which is greater than 10°. The selected liquid-crystal material has a dielectric constant of 25, while the $SiO_2$ forming the dielectric layer has a dielectric constant of 3. In accordance with the known observation that the normal component of the dielectric shift vector D steadily passes through the boundary surface of two dielectric mediums, the field strength is very great in the dielectric layers but is relatively low in the liquid-crystal areas thereabove, actually lower than in the absence of the dielectric layers. Thus, the potential lines are deformed and are squeezed together in the liquid-crystal areas above the picture-dot margins. Consequently, a considerable increase in the field strength may result, for example 2:1 and even up to 4:1 at the marginal corner points. The field strength distribution over a strip-conductor profile is indicated in FIG. 2 by the broken line 11.

The construction above described may be very easily and simply produced, providing the desired inclined edge structures referred to. Thus, following a complete coating of the respective carrier plates with the double layer of electrode and dielectric materials, a single etching operation may be effected and as the etching medium will proceed at a constant rate in the double layer, the margin of the double layer will be exposed to the etching medium during a steadily decreasing period of time in the direction toward the carrier plate, resulting in a greater etching action adjacent the surface of the double layer. Consequently, it is merely necessary to terminate the etching operation at the opportune time and in particular to avoid an over etching.

It will be appreciated that the invention is not limited to the example embodiment illustrated, as the invention is directly applicable to matrix and other displays, for example displays of multi-digit alphanumeric characters, graphic display etc. While the structure usually will be operated with finite threshold values $E_{nc}$, in special cases such value can also be eliminated, whereby both the homeotropic nematic as well as a planar-conical meso phase are stable in field-free state. Likewise, any suitable type of operation may be employed and with the exception of the specific layer configuration on the inner plate surfaces, the general construction of the display structure may be widely varied.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A liquid crystal display for the representation of visual images comprising two carrier plates having therebetween in a hermetically sealed arrangement, a layer of cholesteric liquid crystal with a homeotripic wall orientation, each of said carrier plates having a conductor array on its inner surface facing the other, said liquid crystal having at least in a certain frequency range a positively anisotropic susceptibility, and at field strengths equal to or greater than a first threshold value $E_{cn}$ taking on a homeotropically-nematic texture, in which it remains as long as the applied field is greater than a second lower threshold value $E_{nc}$, said conductor arrays having at least one separately operable conductor, the electrodes of at least one of the two carrier plates having a dielectric layer thereon, the dielectric constant of which is smaller than that of the LC layer, said dielectric layer being so dimensioned relative to the associated electrode that marginal portions of the latter are exposed, respective marginal portions defining a plurality of picture segments, with said marginal portions defining a marginal zone each of which operatively encircles a respective display segment, which marginal zone during operation of the liquid crystal display, each have a minimum field strength $E_n$ equal or greater than $E_{cn}$, in the liquid-crystal layer, and simultaneously a holding field strength $E_h$, lower than $E_{cn}$, at the location of the picture segment enclosed by the marginal zone, during operation of the liquid crystal display, the marginal edges of the combined electrode and dielectric layers forming an approximately flat edge wall composed of the lower electrode edge and the upper aligned dielectric edge, such edge wall being inclined in the form of a beveled edge whereby the electrode edge extends outwardly beyond the dielectric edge.

2. A liquid-crystal display according to claim 1, wherein each conductor strip has a transverse cross-section approximating an isosceles trapezoid.

3. A liquid-crystal display according to claim 2, wherein a straight line approximating said inclined edge wall forms an angle of at least 10° with the plate normal.

4. A liquid-crystal display according to claim 1, characterized in that the dielectric layer consists of $SiO_2$.

5. A liquid-crystal display according to claim 3, characterized in that the dielectric layer consists of $SiO_2$.

6. A liquid-crystal display according to claim 1 in the form of a display matrix, wherein the conductors of each plate are in the form of parallel strips, those on one plate extending normal to those on the other path.

7. A liquid-crystal display according to claim 5, in the form of a display matrix, wherein the conductors of each plate are in the form of parallel strips, those on one plate extending normal to those on the other path.

8. A liquid-crystal display according to claim 1 wherein, with a plate spacing of 10 to 20 μum and an electrode-coating thickness of 0.1 to 0.5 μum, the dielectric layer is 0.6 to 3μum thick, and preferably consists of $SiO_2$.

9. A liquid-crystal display according to claim 7 wherein, with a plate spacing of 10 to 20 μum and an electrode-coating thickness of 0.1 to 0.5 μum, the dielectric layer is 0.6 to 3 μum thick, and preferably consists of $SiO_2$.

10. A method of producing a liquid crystal display, for the representation of visual images, which comprises two carrier plates having therebetween, in hermetically sealed arrangement, a layer of cholesteric liquid crystal with a homeotropic wall orientation, each of said carrier plates having a conductor array on its inner surface facing the other, said liquid crystal having at least in a certain frequency range a positively anisotropic susceptibility, and at field strengths equal to or greater than a first threshold value $E_{cn}$ taking on a homeotropically-nematic texture, in which it remains as long as the applied field is greater than a second lower threshold value $E_{nc}$, the electrodes of at least one of the two carrier plates having a dielectric layer thereon, with the dielectric layer being so dimensioned relative to the associated electrode that marginal portions of the latter are exposed, whereby the electrode edge extends outwardly beyond the dielectric edge, comprising the steps of coating one face of each carrier plate with an electrode coating and at least one electrode surface with a dielectric layer, whereby at least one carrier plate is thereby provided with a double layer, photo-masking upon the layers of the respective plates the display electrode configuration, and etching the respective plates, simultaneously etching the double layer until the desired edge formation is produced, thereafter assembling the two carrier plates in operative spaced relation, enclosing the marginal edge portions therebetween to form a chamber, filling the chamber with a liquid crystal material, and finally sealing the filled chamber.

11. A method according to claim 10, wherein the margin of the dielectric layer is etched to a greater degree than the electrode edge whereby the marginal edges of the combined electrode and dielectric layers form an approximately flat edge wall composed of the lower electrode edge and the upper aligned dielectric edge, which edge wall is inclined in the form of a beveled edge.

* * * * *